(No Model.)

J. BURNS.
APPARATUS FOR FEEDING HYDROCARBON TO FURNACES.

No. 453,142. Patented May 26, 1891.

Witnesses:

Inventor:
JOHN BURNS,
by William H. Low,
Attorney.

UNITED STATES PATENT OFFICE.

JOHN BURNS, OF ROCHESTER, ASSIGNOR OF ONE-HALF TO JOHN H. REYNOLDS, OF TROY, NEW YORK.

APPARATUS FOR FEEDING HYDROCARBON TO FURNACES.

SPECIFICATION forming part of Letters Patent No. 453,142, dated May 26, 1891.

Application filed August 5, 1890. Serial No. 361,105. (No model.)

*To all whom it may concern:*

Be it known that I, JOHN BURNS, of Rochester, in the county of Monroe and State of New York, have invented new and useful Improvements in Apparatus for Feeding Hydrocarbons to Furnaces, Lamps, and other Appliances, of which the following is a specification.

The dangers attendant upon the use of hydrocarbon as a fuel are well known and have formed the most potent objection to its adoption for such purposes. Many plans have been suggested for avoiding or mitigating said dangers, of which few, if any, have proved moderately successful.

The object of my invention is to provide an apparatus for feeding the hydrocarbons into furnaces, lamps, and other appliances from a distantly-located tank, which may be protected by surrounding it with earth, water, or other suitable protecting material, the hydrocarbon being ejected from said tank by means of water or other liquid of greater specific gravity than the hydrocarbon, and after the supply of hydrocarbon in said tank is exhausted, said liquid being ejected from said tank by a fresh supply of hydrocarbon under a sufficient pressure to overcome the superior specific gravity of the water or other liquid. This object I attain by the means illustrated in the accompanying drawings, which are herein referred to, and form part of this specification, and in which—

Figure 1:
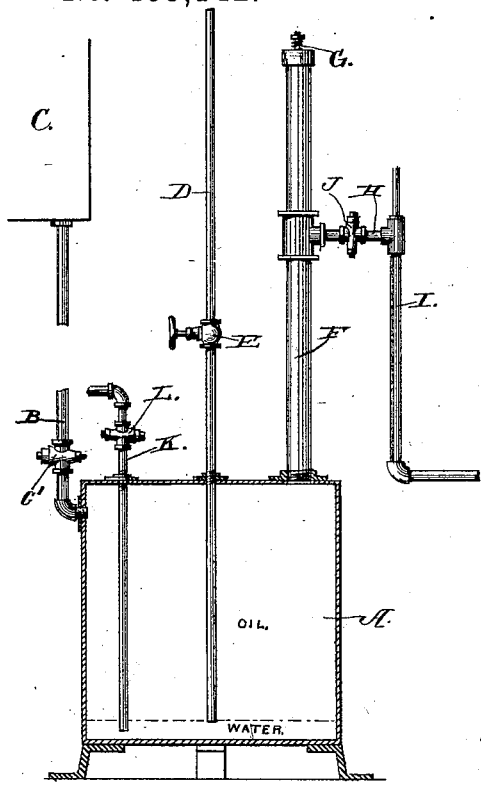
Figure 2:
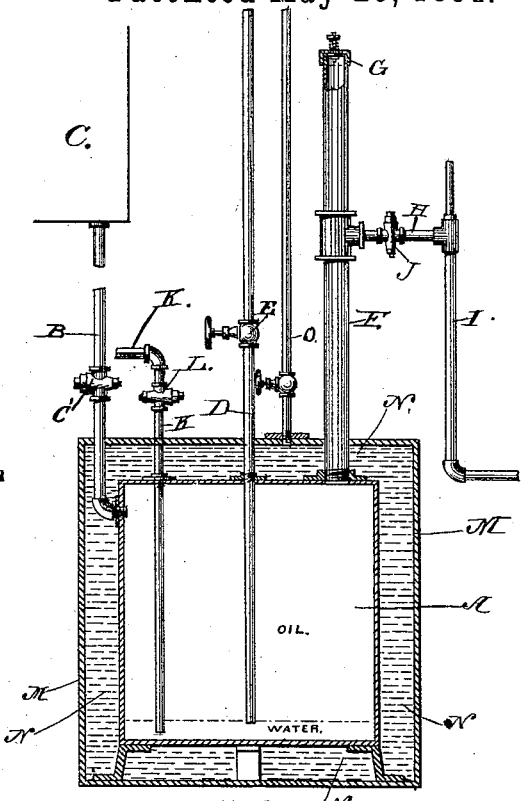
Figure 3:
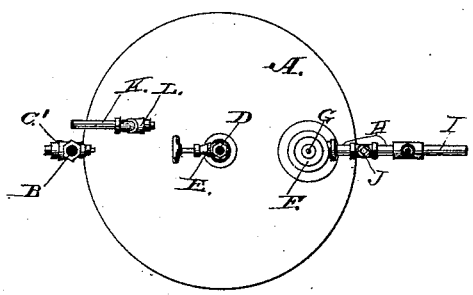

Figure 1 is a vertical section of the distributing-tank of my apparatus with the pipes and stop-cocks shown in elevation. Fig. 2 is a like section of said distributing-tank inclosed by a case filled with water or other suitable protecting-fluid, and Fig. 3 is a plan view of Fig. 1.

As represented in the drawings, A designates the distributing-tank of my apparatus, which may be made of any suitable form and material and of a capacity suited to the purpose for which it is used.

B is the oil-supply pipe, which connects said distributing-tank with an oil-reservoir C, which is preferably located distantly from said tank and at such an elevation above the latter that the ejectment of water from said tank under the conditions hereinafter explained will be rendered a matter of certainty. Said oil-supply pipe is provided with a suitable stop-cock or valve C′, whereby the flow of oil into the tank A can be governed, as occasion may require.

D is a water-supply pipe, which connects the tank A with a water-reservoir or other source of water-supply, whereby a sufficient head or pressure can be obtained for effecting the ejectment of the oil from the tank A. Said water-supply pipe is extended down nearly to the bottom of the tank A, and above the latter said pipe is provided with a stop-cock or valve E, by which the flow of water into said tank can be regulated or prevented, as occasion may require.

F is a stand-pipe, connected to the upper part of the tank A for the purpose of maintaining a column of oil therein above the point or points of delivering the oil from said stand-pipe into the lateral pipes, through which the oil is conveyed to the place or places required. The upper end of said stand-pipe is preferably provided with an inwardly-opening valve G for the purpose of preventing the formation of a vacuum in said pipe. At one or more points said stand-pipe is provided with one or more horizontal branch pipes H for delivering the oil into distributing-pipes I, through which said oil may be conveyed to any required point below the level of the top of the stand-pipe F. Each of the branch pipes H is provided with a stop-cock J for the purpose of closing the communication through said pipe when it is necessary or desirable to do so.

K is a waste-pipe, which is connected to the tank A and extends inside of the latter to near the bottom of the same. Said waste-pipe is provided for the purpose of conveying the water from said tank after the water has performed its function of forcing the oil from the tank. A stop-cock L is inserted in said waste-pipe for the purpose of closing the communication therethrough when occasion may require. A lateral portion of said waste-pipe is arranged at a sufficient distance below the oil-reservoir C to obtain the head required to allow the pressure of oil derived from said head to effect the ejectment of the water from the tank A after said water has performed its function of ejecting the oil therefrom.

In the modification shown in Fig. 2, which is especially designed for use on vessels or in buildings wherein the hydrocarbon may be exposed to the danger of accidental ignition, the distributing-tank A is inclosed in an outer casing M, so as to form a water-space N, which entirely surrounds said tank for the purpose of affording protection from fire to the latter. A water-supply pipe O connects said water-space with a water-supply for the purpose of replenishing the water in said water-space when occasion may require.

The operation of my invention is as follows: A sufficient quantity of water is first introduced into the tank A to reach the lower end of the waste-pipe K for the purpose of preventing oil from flowing into said waste-pipe. Then, the stop-cock J being open to allow the air in said tank to flow into the distributing-pipes I, the oil from the oil-supply, which may be a reservoir, as shown in the drawings, a car-tank, or any other suitable means for supplying the oil, is allowed to flow into the tank A until the latter is properly charged. The stop-cock C' is then closed to prevent any outflow of the oil through the pipe B. The stop-cock E is then opened to allow water to flow into the tank A through the pipe D. Said water will form a stratum in the lower part of the tank A and force the oil to pass into the stand-pipe F as fast as it (the oil) is displaced by the water flowing into said tank. The rapidity of the discharge of the oil from the tank A will be dependent upon the quantity of oil ejected through the distributing-pipes I, one being reciprocal of the other. After the charge of oil is discharged from the tank A the latter will be left filled with water, which must necessarily be ejected therefrom while refilling the tank with oil, and for this purpose the stop-cock E is first closed to prevent more water from flowing into said tank through the pipe D. The stop-cock L is opened to permit the water contained in the tank A to be ejected therefrom through the waste-pipe K, and finally the stop-cock C' is opened to allow the oil to flow into said tank. The oil, being under pressure, due to its altitude above the water in the tank A, displaces the water, which will flow from said tank through the pipe K until the stop-cock C' is again closed, which action should occur at the time that the tank has become refilled with oil, and the apparatus is then in condition for a repetition of the operation, omitting the preliminary charge of water hereinbefore described. By the distributing-pipes I the oil from the tank A may be conducted to furnaces, lamps, or other appliances wherein it is to be burned, whether said furnace or other appliance is in close proximity to or remote from the tank A.

What I claim as my invention, and desire to secure by Letters Patent, is—

1. The combination of a closed oil-distributing tank provided with a stand-pipe extending upwardly above the highest level of delivery of oil from said tank, a distributing pipe or pipes connected to said stand-pipe, each of said distributing-pipes being provided with a stop-cock, an oil-supply pipe which forms a connection between said distributing-tank and the oil-supply, said pipe being provided with a stop-cock, and a water-supply pipe which connects said tank with a water-supply operating under pressure, said pipe being provided with a stop-cock, as herein set forth, the several parts being combined, as described, to form an apparatus whereby the oil contained in said distributing-tank may be ejected therefrom by means of water flowing into said tank through said water-supply pipe, as and for the purpose herein specified.

2. The combination of an oil-distributing tank, a water-supply pipe which connects said oil-distributing tank with the water-supply, a waste-water pipe leading from said tank near its lower part and fitted to discharge the water from said tank above the level of the top of the latter, said waste-pipe being provided with a stop-cock, and an oil-supply pipe fitted to deliver oil into said tank under pressure, whereby the spent water in said tank will be ejected therefrom, as and for the purpose herein specified.

JOHN BURNS.

Witnesses:
JNO. C. FELTMAN,
WM. H. LOW.